US012702604B2

(12) United States Patent
Adams, Jr.

(10) Patent No.: US 12,702,604 B2
(45) Date of Patent: *Aug. 11, 2026

(54) PORTABLE ADJUSTABLE FRAME SYSTEM

(71) Applicant: James Russell Adams, Jr., Palestine, TX (US)

(72) Inventor: James Russell Adams, Jr., Palestine, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/052,119

(22) Filed: Feb. 12, 2025

(65) Prior Publication Data

US 2025/0318970 A1 Oct. 16, 2025

Related U.S. Application Data

(63) Continuation of application No. 18/594,513, filed on Mar. 4, 2024, now Pat. No. 12,251,343.

(51) Int. Cl.
*A61G 5/10* (2006.01)

(52) U.S. Cl.
CPC .................................. *A61G 5/1094* (2016.11)

(58) Field of Classification Search
CPC ....... Y10S 297/04; A47B 23/02; A47B 83/02; A61G 5/1094; A61G 5/10
USPC .......................................................... 280/727
See application file for complete search history.

(56) References Cited

U.S. PATENT DOCUMENTS

| | | | | | | |
|---|---|---|---|---|---|---|
| 3,146,891 | A | * | 9/1964 | Nawman | B65D 7/26 | 206/509 |
| 4,526,419 | A | * | 7/1985 | Bowman | A61G 5/10 | 224/407 |
| 4,580,803 | A | * | 4/1986 | Davis | A61G 5/10 | 224/407 |
| 4,685,726 | A | * | 8/1987 | Wolpert, Jr. | A61G 5/1094 | 297/150 |
| 4,812,075 | A | * | 3/1989 | Lavin, Sr. | A47B 96/06 | 403/205 |
| 4,848,833 | A | * | 7/1989 | Grall | A61G 5/10 | 297/161 |
| 5,228,711 | A | * | 7/1993 | Summers | A61G 5/1094 | 297/161 |
| 5,558,391 | A | * | 9/1996 | Chavous | A61G 5/10 | 297/153 |
| 6,109,625 | A | * | 8/2000 | Hewitt | F16M 11/18 | 280/43.24 |

(Continued)

*Primary Examiner* — James A Shriver, II
*Assistant Examiner* — Hilary L Johns
(74) *Attorney, Agent, or Firm* — Kirby Drake

(57) ABSTRACT

Portable adjustable frame systems may be used in connection with mobility assistance equipment to improve accessibility for users. Various brackets may be employed to attach the portable adjustable frame system to mobility assistance equipment depending on the type of mobility assistance equipment to which the portable adjustable frame system may be attached. The portable adjustable frame system may include adjustable legs that may help to removably secure the portable adjustable frame system to the mobility assistance equipment. The portable adjustable frame system may be utilized by sliding in relative to the mobility assistance equipment without the need for brackets. Trays and/or baskets may be attached to the portable adjustable frame system to provide additional accessibility for users.

20 Claims, 10 Drawing Sheets

(56) References Cited

U.S. PATENT DOCUMENTS

| | | | | |
|---|---|---|---|---|
| 6,722,681 | B1 * | 4/2004 | Large | A61G 5/10<br>297/150 |
| 7,500,689 | B2 * | 3/2009 | Pasternak | A61G 5/1094<br>297/188.08 |
| 10,576,001 | B1 * | 3/2020 | Makins | A61G 5/1094 |
| 2003/0192847 | A1 * | 10/2003 | Jahrling | F24C 15/168<br>211/175 |
| 2007/0114755 | A1 * | 5/2007 | Pasternak | A61G 5/10<br>280/304.1 |

* cited by examiner

PORTABLE ADJUSTABLE FRAME SYSTEM

CROSS-REFERENCE TO RELATED APPLICATION

The present Application is a continuation of, and claims priority to, U.S. patent application Ser. No. 18/594,513 filed Mar. 4, 2024, the disclosure of which is incorporated by reference in its entirety.

FIELD OF THE DISCLOSURE

The present disclosure generally relates to portable adjustable frame systems, and more particularly to portable adjustable frame systems for use in connection with mobility assistance equipment, such as manual wheelchairs.

BACKGROUND

When a person regularly uses a manual wheelchair, he/she may remain seated in the manual wheelchair to perform tasks, such as eating. This may present problems for the person because the arms of the manual wheelchair are positioned such that the person may not be able to easily reach the table for eating. This may lead to accidents and may make these routine tasks less enjoyable for the person.

SUMMARY

Embodiments of the present disclosure may provide a portable adjustable frame system for use in connection with mobility assistance equipment having two arms a seat portion, the system comprising: two arm portions positioned parallel to one another and slidably aligned with the two arms of the mobility assistance equipment, the two arm portions each having a first end and a second end; a first support portion secured at a perpendicular angle to the first end of each of the two arm portions; a second support portion secured at a perpendicular angle to the two arm portions at a securement point in between the first end and the second end of the two arm portions, wherein the two arm portions and the two support portions form a square when secured to one another; and at least one leg portion extending from the second support portion that rests on the seat portion of the mobility assistance equipment when the portable adjustable frame system is secured to the mobility assistance equipment. The mobility assistance equipment may be a manual wheelchair, a walker, or a transport chair. The two arm portions and the first and second support portions may be permanently secured to one another. The first and second support portions may be adjustable to expand the frame system relative to a width of the mobility assistance equipment. The frame system may be expandable to a width between 14 and 24 inches. The frame system also may include a tray that is secured to a frame formed from the two arm portions and the first and second support portions. The tray may be foldable and/or may be capable of being angled. The tray may have reinforced edges so that items placed on the tray may not easily slide off when the mobility assistance equipment moves while the portable adjustable frame system is attached. The frame system also may include a basket that is secured to a frame formed from the two arm portions and the first and second support portions. The frame system may be collapsible for storage or transport. The frame system may be lightweight and durable with a load capacity of approximately 120 pounds.

Other embodiments of the present disclosure may provide a portable adjustable frame system for use in connection with mobility assistance equipment having two arms, the system comprising: two arm portions positioned parallel to one another, the two arm portions each having a first end and a second end; a first support portion secured at a perpendicular angle to the first end of each of the two arm portions; a second support portion secured at a perpendicular angle to the two arm portions at a securement point in between the first end and the second end of the two arm portions, wherein the two arm portions and the two support portions form a square when secured to one another; and at least one bracket that is capable of removably attaching the frame system to the mobility assistance equipment. The at least one bracket may have a rectangular, square, or round shape corresponding to a shape of the two arm portions of the frame system. The at least one bracket may include a front and a back bracket. The at least one bracket may secure to the two arms of the mobility assistance equipment through a fastening mechanism attached to the frame system. The first and second support portions may be adjustable to expand the frame system relative to a width of the mobility assistance equipment. The system also may include a tray that is secured to a frame formed from the two arm portions and the first and second support portions. The system may further include a basket that is secured to a frame formed from the two arm portions and the first and second support portions. The frame system may be collapsible for storage or transport.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure may provide portable adjustable frame systems that may be used in connection with mobility assistance equipment, such as manual wheelchairs, walkers, transport chairs, and the like. While certain mobility assistance equipment is identified herein, it should be appreciated that the frame system may be used with other similar equipment not specifically identified without departing from the present disclosure. There may be some embodiments of the present disclosure where the frame system may attach to a task chair or office chair.

Figure 1:
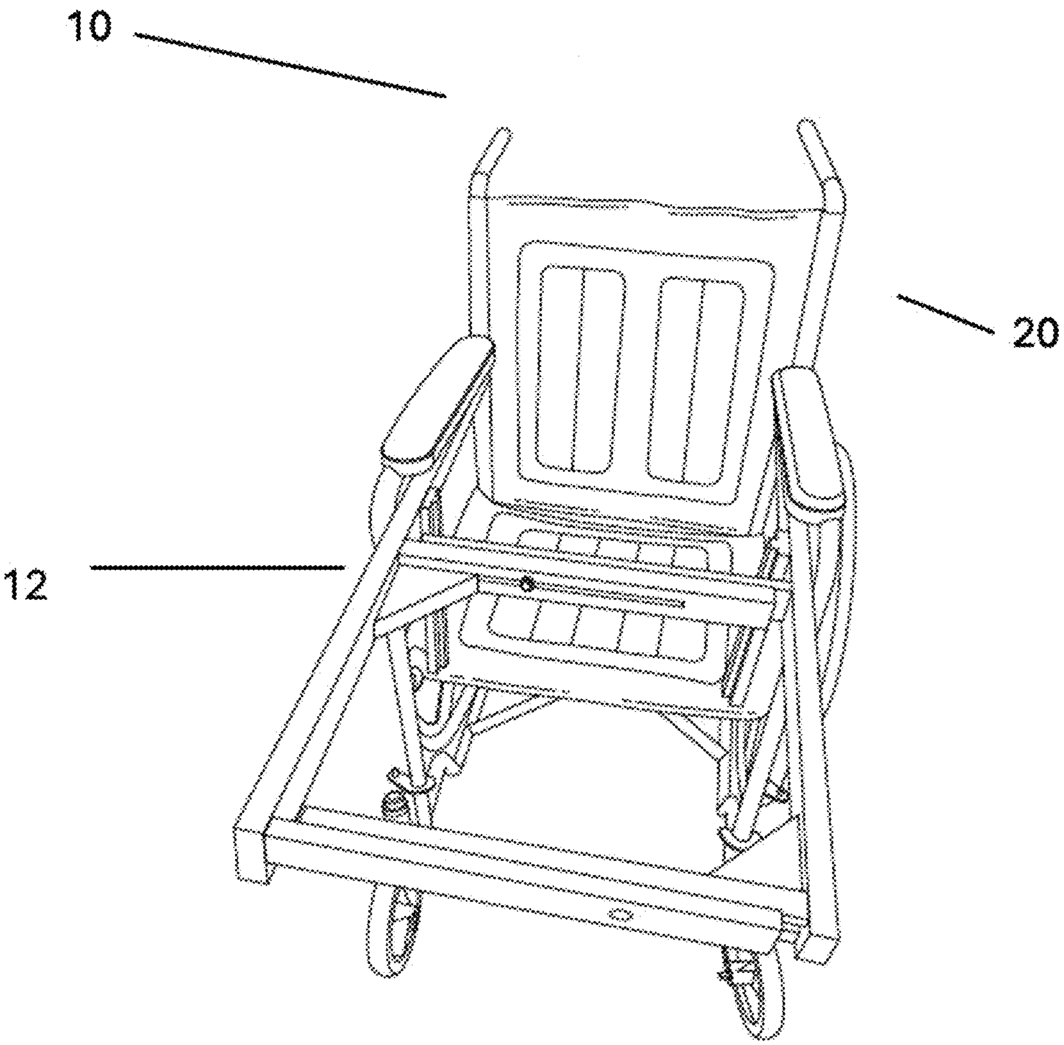
FIG. 1 depicts a manual wheelchair utilizing a portable adjustable frame system according to an embodiment of the present disclosure.
Figure 2:
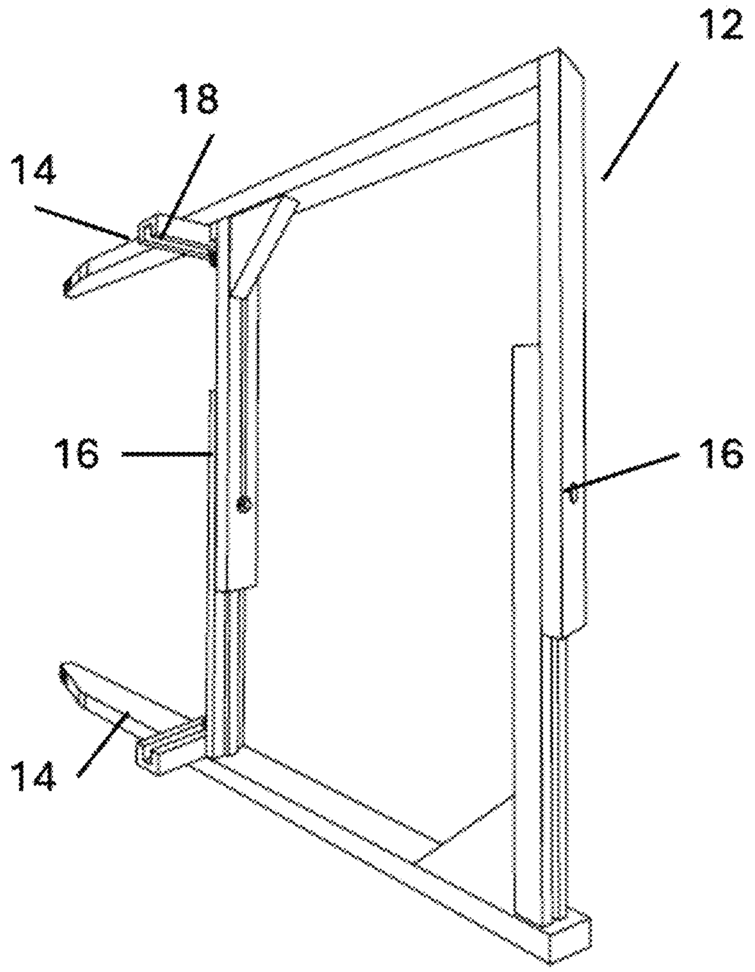
FIG. 2 depicts a portable adjustable frame system according to an embodiment of the present disclosure.

FIG. 1 depicts manual wheelchair 10 utilizing portable adjustable frame system 12 according to an embodiment of the present disclosure. FIG. 2 depicts portable adjustable frame system 12 according to an embodiment of the present disclosure. In an embodiment of the present disclosure, portable adjustable frame system 12 as depicted in FIG. 2 may be inserted/attached to manual wheelchair 10 as depicted in FIG. 1.

Portable adjustable frame system 12 according to embodiments of the present disclosure (FIG. 2) may be formed of two arm portions 14 that may align with the arms/armrests of the mobility assistance equipment. The two arm portions 14 are parallel to one another and may be secured to one another by two support portions 16 that are secured at perpendicular angles to arm portions 14. Accordingly, when secured, the two arm portions 14 and the two support portions 16 may form a square. However, they may form another shape without departing from the present disclosure. It should be appreciated that the arm portions 14 and support portions 16 may be permanently attached to one another in embodiments of the present disclosure; however, there may be embodiments of the present disclosure where they may be removably secured.

It also should be appreciated that the two support portions 16 may provide adjustability so that the frame system 12 may expand relative to the size of the mobility assistance equipment, for example. It should be appreciated that the frame system 12 can adjust from 14 inches and beyond. However, it may be best for the frame system 12 not to expand to be larger than a typical door frame, such as 20-24 inches, so that the system 12 may remain attached to the manual wheelchair 10 when moving around.

Figure 3:
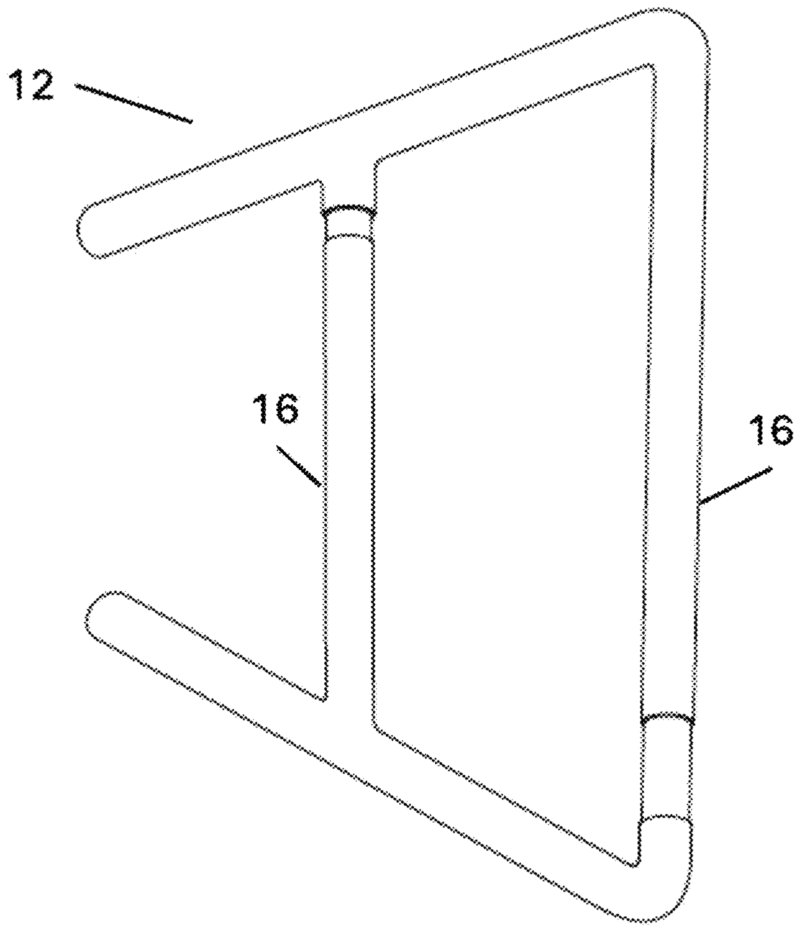
FIG. 3 depicts a portable adjustable frame system according to another embodiment of the present disclosure.

The arm portions 14 and support portions 16 forming the frame system 12 may be formed of one or more materials including, but not limited to, wood, light metal, aluminum, steel, plastic (i.e., tubing), or other similar materials in embodiments of the present disclosure. For example, FIG. 3 depicts portable adjustable frame system 12 according to another embodiment of the present disclosure. This embodiment may be formed of a plastic, such as PVC or tubular steel, and the frame may be round. As depicted herein, there may be adjustability in the frame through support portions 16.

As described herein, various brackets may be employed to attach the portable adjustable frame system to mobility assistance equipment depending on the type of mobility assistance equipment to which the portable adjustable frame system may be attached. Brackets may be used to accommodate the frame system and/or mobility assistance equipment. Brackets may be formed of different shapes that may include, but are not limited to, rectangular, square, and/or round. While certain shapes are identified herein, it should be appreciated that other brackets may be employed depending on the type of frame and/or type of mobility assistance equipment. It also may be appreciated that there may be embodiments of the present disclosure where the bracket may change depending on the material forming the frame system. For example, the bracket can be made rectangular, square, or round for a frame of steel tubing, plastic tubing (pipe), or another shape.

In an embodiment of the present disclosure, the mobility assistance equipment may be manual wheelchair 10 that may have arm rests 20 that are not removable (FIG. 1). Accordingly, portable adjustable frame system 12 may include adjustable legs 18 (FIG. 2) that may help to removably secure portable adjustable frame system 12 to manual wheelchair 10. The portable adjustable frame system 12 may be utilized by sliding in relative to the manual wheelchair 10 without the need for brackets.

Figure 6A:
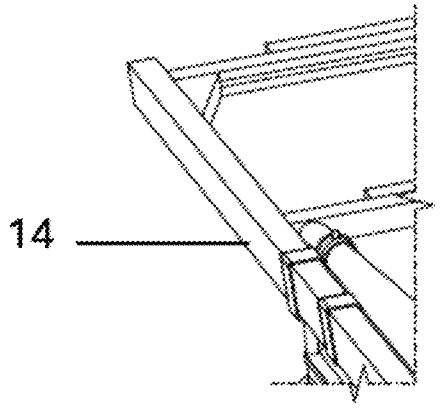
FIG. 6A depicts an arm of a portable adjustable frame system according to another embodiment of the present disclosure.
Figure 6B:
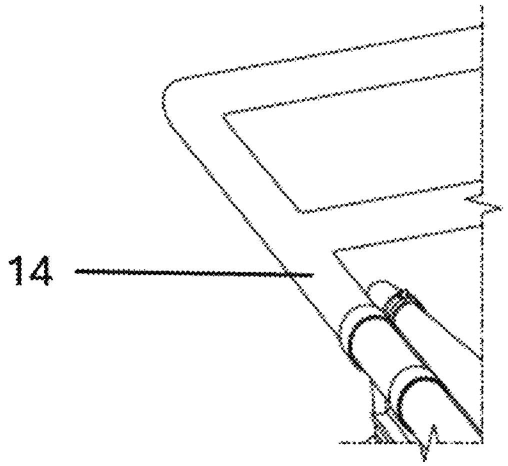
FIG. 6B depicts an arm of a portable adjustable frame system according to another embodiment of the present disclosure.
Figure 7A:
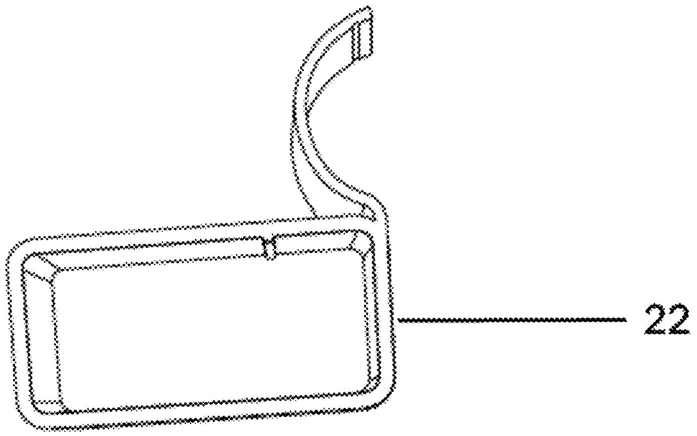
FIG. 7A depicts a bracket for a portable adjustable frame system according to another embodiment of the present disclosure.
Figure 7B:
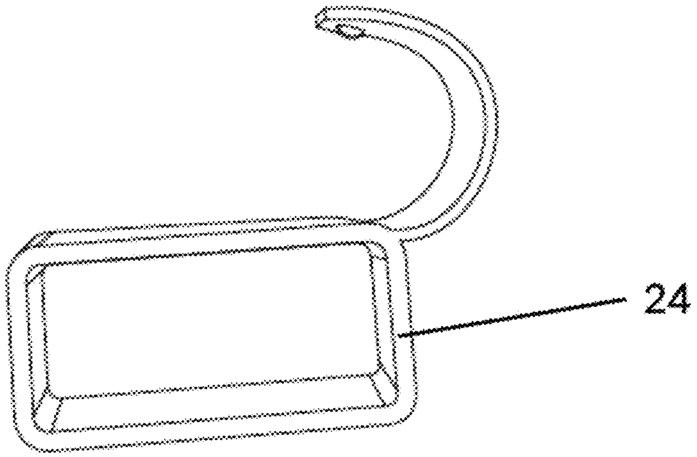
FIG. 7B depicts a bracket for a portable adjustable frame system according to another embodiment of the present disclosure.
Figure 9:
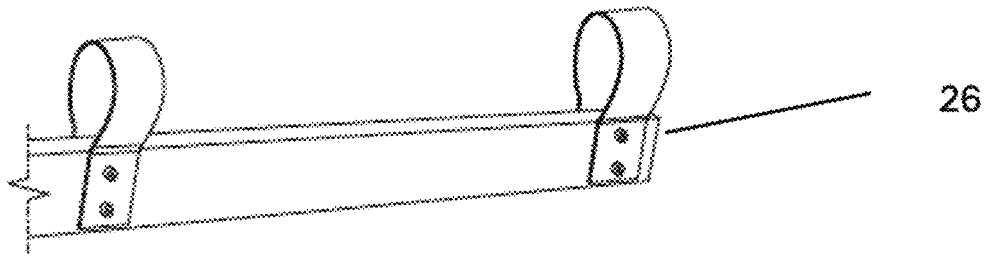
FIG. 9 depicts a bracket for a portable adjustable frame system according to another embodiment of the present disclosure.

In another embodiment of the present disclosure, the mobility assistance equipment may be a manual wheelchair that may have arm rests that are removable. Brackets may be employed on the portable adjustable frame system, and the brackets may be of different shapes that may correspond to the type of arms on the manual wheelchair. FIG. 6A depicts an arm 14 of a portable adjustable frame system according to another embodiment of the present disclosure. FIG. 6B depicts an arm 14 of a portable adjustable frame system according to another embodiment of the present disclosure. FIG. 7A depicts a bracket 22 for a portable adjustable frame system according to another embodiment of the present disclosure. FIG. 7B depicts a bracket 24 for a portable adjustable frame system according to another embodiment of the present disclosure. More specifically, FIG. 7A and FIG. 7B depict a front and back bracket 22, 24 for a rectangular frame. FIG. 9 depicts a bracket 26 for a portable adjustable frame system according to another embodiment of the present disclosure. This embodiment may include a back bracket that may screw onto arm 14. It may rotate with a bracket on top that may screw on the frame system in an embodiment of the present disclosure.

Figure 8A:
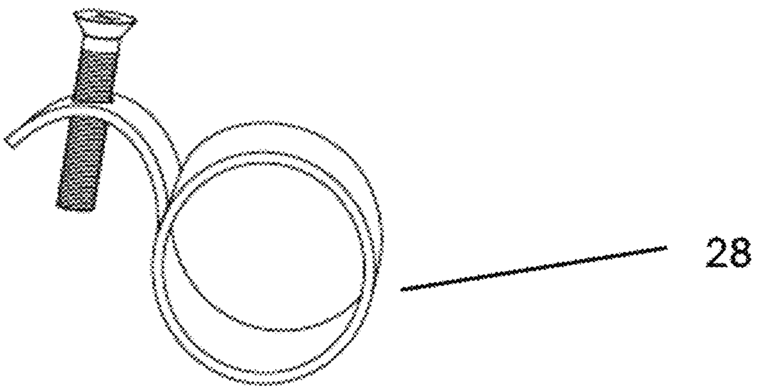
FIG. 8A depicts a bracket for a portable adjustable frame system according to another embodiment of the present disclosure.
Figure 8B:
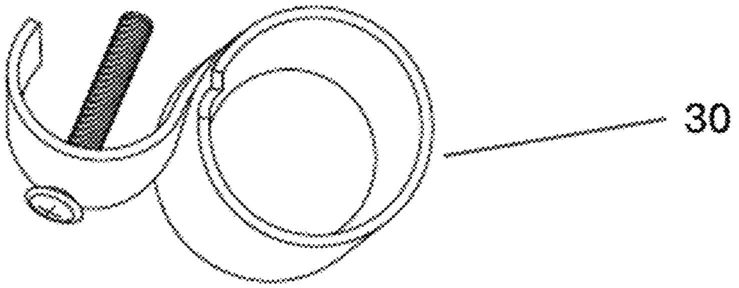
FIG. 8B depicts a bracket for a portable adjustable frame system according to another embodiment of the present disclosure.

In a further embodiment of the present disclosure, the mobility assistance equipment may be a manual wheelchair that may have round arm rests. The portable adjustable frame system may provide round brackets that attach to the frame. FIG. 8A depicts a bracket 28 for a portable adjustable frame system according to another embodiment of the present disclosure. FIG. 8B depicts a bracket 30 for a portable adjustable frame system according to another embodiment of the present disclosure. FIGS. 8A-8B depict front and back brackets 28, 30 for a round frame according to an embodiment of the present disclosure.

The portable adjustable frame system 12 according to an embodiment of the present disclosure may provide a portable and adjustable frame 12A that may fit under the armrests 20 and sit on the frame of a manual wheelchair 10. A portable tray 32 (FIG. 4) can be placed on the frame or a shopping basket for personal use. It may easily attach to the wheelchair 10 and not be permanently physically attached which may allow for fast and easy removal. Someone with limited mobility can easily install the frame system on their own.

The frame system 12 may be adjustable and sturdy and can fit various manual wheelchairs and accommodate those of various weights. A person's weight may affect the width of the wheelchair frame and this one can be adjusted to accommodate various weights with a slight slide of the support braces. The frame system 12 according to embodiments of the present disclosure may be lightweight and durable with a load capacity of more than 120 pounds. However, it should be appreciated that the load capacity may be increased depending on the material forming the frame system and/or the weight of the wheelchair to which it may be attached. Further, the load capacity may be dictated by the load bearing limits of the wheelchair or mobility assistance equipment. For example, if the limit is 300 pounds and the user's weight is 250 pounds, the wheelchair or mobility assistance equipment may only handle an additional 50 pounds.

Figure 4:
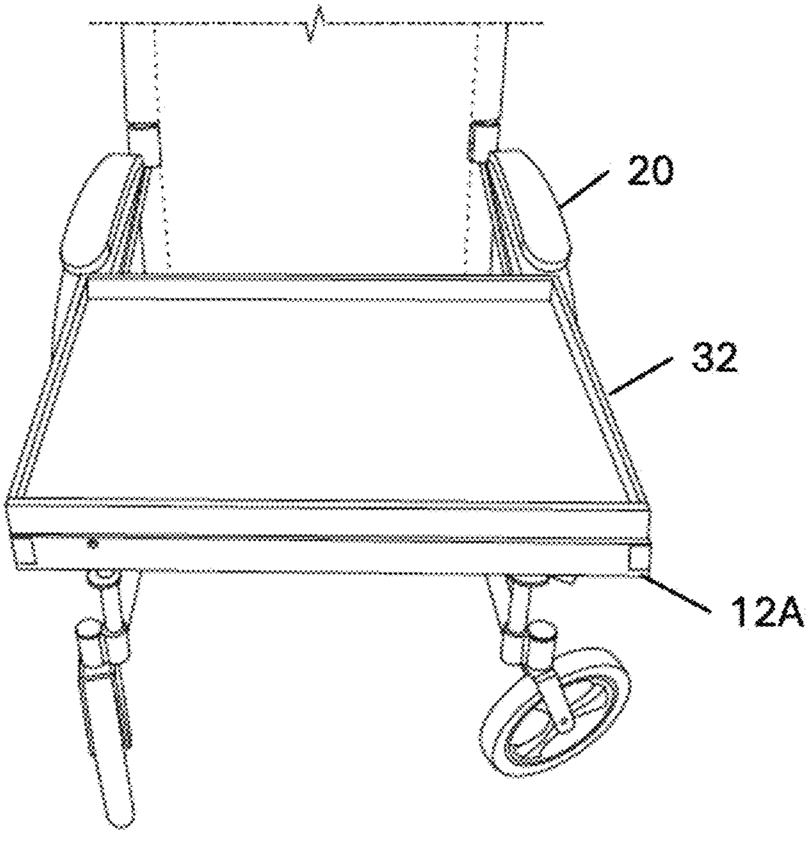
FIG. 4 depicts a manual wheelchair utilizing a portable adjustable frame system incorporating a tray according to another embodiment of the present disclosure.

FIG. 4 depicts a manual wheelchair 10 utilizing a portable adjustable frame system 12 incorporating a tray 32 according to another embodiment of the present disclosure. Portable adjustable frame systems according to embodiments of the present disclosure may provide users with the capability to carry and hold items on a tray 32. The tray 32 associated with the frame system 12 may provide a capability for the user to have multiple items readily available. This could include a television remote, drink, meal, laptop, notebook, puzzle, journal, sacks of goodies, crafts, among other items. It can be used in the home or outside the home including, but not limited to, a restaurant, a buffet, banquet, and/or reception.

It should be appreciated that the tray 32 may be formed as part of (integral with) the portable adjustable frame system 12 or may be separable from the portable adjustable frame system 12 in embodiments of the present disclosure. There may be embodiments of the present disclosure where the tray 32 may be foldable and/or may be angled, such as for the user to read a book or use a tablet/mobile device. The tray 32 may have reinforced edges so that items placed on the tray 32 may not easily slide off when the manual wheelchair is moved while the tray/system is attached. It should be appreciated that the tray 32 may be of varying sizes relative to the base of the frame system. The tray 32 may be secured as part of the system so that it may not slide forward or backward, whether in a stationary position or while in movement.

Figure 5:
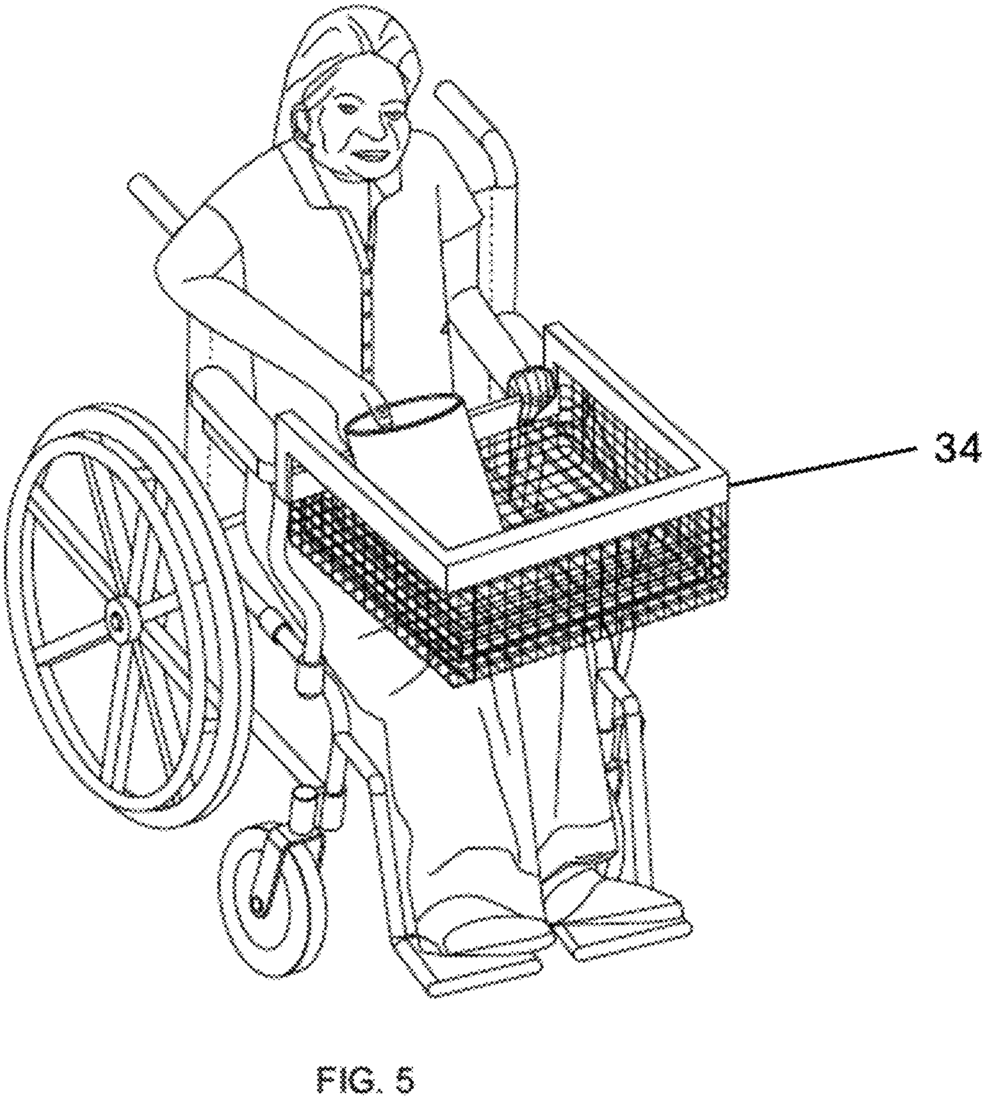
FIG. 5 depicts a portable adjustable frame system incorporating a basket according to another embodiment of the present disclosure.

FIG. 5 depicts a portable adjustable frame system 12 incorporating a basket 34 according to another embodiment of the present disclosure. The basket 34 associated with the frame system 12 may provide a capability for the user to shop for multiple items at one time with more space than available on the user's lap or in pockets that may be associated with the wheelchair. Mobility may remain unaffected by the items placed in the basket 34, and the person can shop and manage their manual wheelchair at the same time without assistance.

Figure 10:
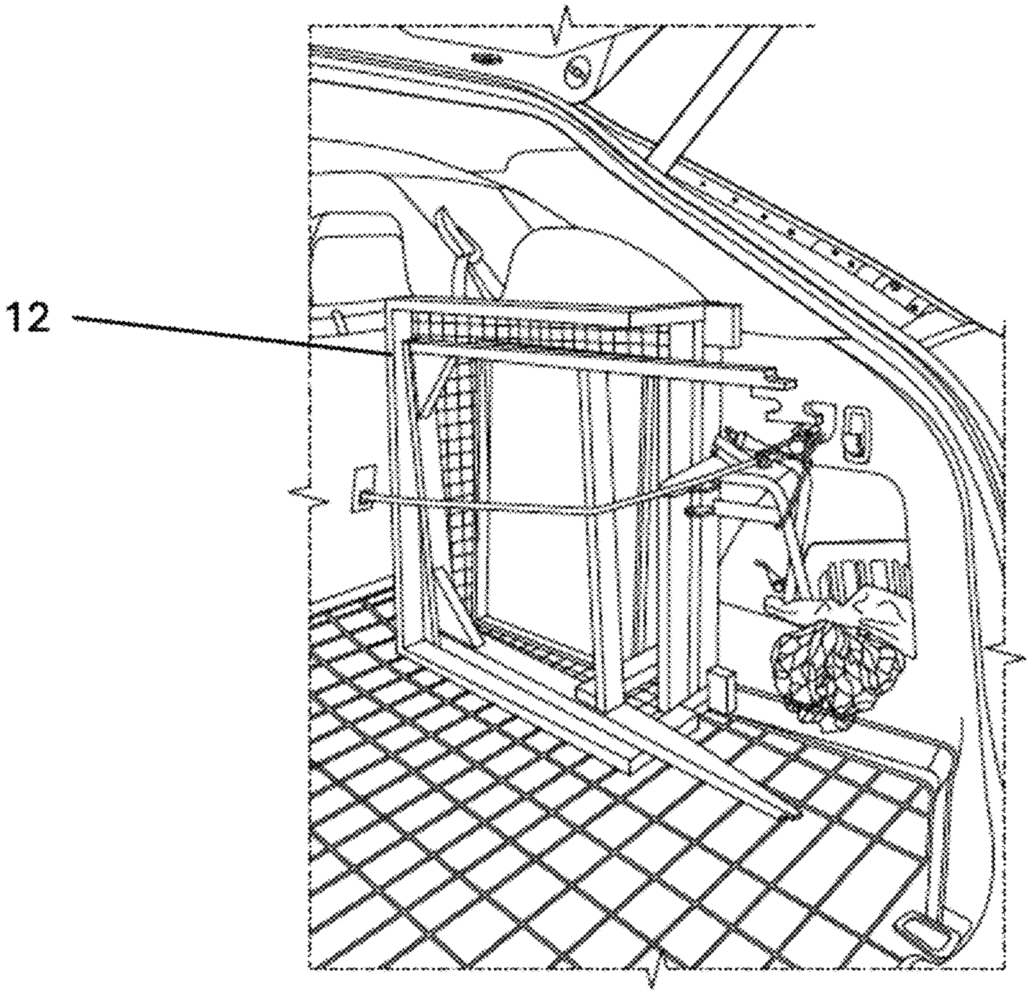
FIG. 10 depicts storage of a portable adjustable frame system according to an embodiment of the present disclosure.

FIG. 10 depicts storage of a portable adjustable frame system 12 according to an embodiment of the present disclosure. As depicted herein, the frame system 12 and any basket or tray that may be associated with the frame system 12 may be stacked on top of one another and secured in the back of a vehicle for transport. Accordingly, the frame system 12 and any accessories may not take up a significant amount of space for transport, especially given the space that typical mobility assistance equipment may take up on its own.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A portable adjustable frame system for use in connection with mobility assistance equipment having two arms and a seat portion, the portable adjustable system comprising:

two arm portions positioned parallel to one another and slidably aligned with the two arms of the mobility assistance equipment, the two arm portions each having a first end and a second end;

a first support portion secured at a perpendicular angle to the first end of each of the two arm portions; and a second support portion secured at a perpendicular angle to the two arm portions at a securement point in between the first end and the second end of the two arm portions, wherein the two arm portions and the two support portions form a frame in a square shape when secured to one another.

2. The portable adjustable frame system of claim 1 further comprising:

at least one leg portion extending from the second support portion that rests on the seat portion of the mobility assistance equipment when the portable adjustable frame system is secured to the mobility assistance equipment.

3. The portable adjustable frame system of claim 1, wherein the two arm portions and the first and second support portions are permanently secured to one another.

4. The portable adjustable frame system of claim 1, wherein the first and second support portions are adjustable to expand the portable adjustable frame system relative to a width of the mobility assistance equipment.

5. The portable adjustable frame system of claim 4, wherein the portable adjustable frame system is expandable to a width between 14 and 24 inches.

6. The portable adjustable frame system of claim 1, wherein the frame selectively receives a tray that is secured to the frame formed from the two arm portions and the first and second support portions.

7. The portable adjustable frame system of claim 6, wherein the tray is foldable.

8. The portable adjustable frame system of claim 6, wherein the tray is capable of being angled when deployed.

9. The portable adjustable frame system of claim 6, wherein the tray has reinforced edges so that items placed on the tray may not easily slide off when the mobility assistance equipment moves while the portable adjustable frame system is attached.

10. The portable adjustable frame system of claim 1, wherein the frame selectively receives a basket that is secured to the frame formed from the two arm portions and the first and second support portions.

11. The portable adjustable frame system of claim 1, wherein the portable adjustable frame system is collapsible for storage or transport.

12. The portable adjustable frame system of claim 1, wherein the portable adjustable frame system is lightweight and durable with a load capacity of approximately 120 pounds.

13. A portable adjustable frame system for use in connection with mobility assistance equipment having two arms, the portable adjustable frame system comprising:

two arm portions positioned parallel to one another, the two arm portions each having a first end and a second end;

a first support portion secured at a perpendicular angle to the first end of each of the two arm portions;

a second support portion secured at a perpendicular angle to the two arm portions at a securement point in between the first end and the second end of the two arm portions, wherein the two arm portions and the two support portions form a frame in a square shape when secured to one another; and at least one bracket that is capable of removably attaching the portable adjustable frame system to the mobility assistance equipment.

14. The portable adjustable frame system of claim 13, wherein the at least one bracket has a rectangular, square, or round shape corresponding to a shape of the two arm portions of the frame system.

15. The portable adjustable frame system of claim 13, wherein the at least one bracket includes a front and a back bracket.

16. The portable adjustable frame system of claim 13, wherein the at least one bracket secures to the two arms of the mobility assistance equipment through a fastening mechanism attached to the portable adjustable frame system.

17. The portable adjustable frame system of claim 13, wherein the first and second support portions are adjustable to expand the portable adjustable frame system relative to a width of the mobility assistance equipment.

18. The portable adjustable frame system of claim 13, wherein the frame selectively receives a tray that is secured to the frame formed from the two arm portions and the first and second support portions.

19. The portable adjustable frame system of claim 13 wherein the frame selectively receives a basket that is secured to the frame formed from the two arm portions and the first and second support portions.

20. The portable adjustable frame system of claim 13, wherein the portable adjustable frame system is collapsible for storage or transport.

* * * * *